United States Patent
Kim et al.

(10) Patent No.: US 9,267,556 B2
(45) Date of Patent: Feb. 23, 2016

(54) APPARATUS AND METHOD FOR DETERMINING ENGINE CLUTCH TRANSFER TORQUE OF ENVIRONMENTALLY-FRIENDLY VEHICLE

(71) Applicant: Hyundai Motor Company, Seoul (KR)

(72) Inventors: Sungdeok Kim, Gyeonggi-Do (KR); Joonyoung Park, Seoul (KR); Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/542,616

(22) Filed: Nov. 16, 2014

(65) Prior Publication Data

US 2016/0025160 A1    Jan. 28, 2016

(30) Foreign Application Priority Data

Jul. 28, 2014  (KR) ........................ 10-2014-0095818

(51) Int. Cl.
*G06F 17/00*     (2006.01)
*F16D 48/06*     (2006.01)

(52) U.S. Cl.
CPC ........... *F16D 48/066* (2013.01); *Y10S 903/902* (2013.01)

(58) Field of Classification Search
None
See application file for complete search history.

(56) References Cited

U.S. PATENT DOCUMENTS

| | | | | |
|---|---|---|---|---|
| 8,672,805 | B2 * | 3/2014 | Akebono | B60W 10/02 477/180 |
| 8,795,131 | B2 * | 8/2014 | Yamazaki | B60W 10/06 477/3 |
| 9,056,613 | B2 * | 6/2015 | Johri | B60W 10/08 |
| 2011/0153134 | A1 | 6/2011 | Rocq et al. | |
| 2014/0163790 | A1 * | 6/2014 | Kim | B60W 20/40 701/22 |
| 2014/0163793 | A1 * | 6/2014 | Kim | B60W 20/10 701/22 |
| 2015/0165890 | A1 * | 6/2015 | Liang | B60W 10/023 477/5 |
| 2015/0183424 | A1 * | 7/2015 | Kim | B60W 20/40 701/22 |

FOREIGN PATENT DOCUMENTS

| | | |
|---|---|---|
| JP | 2012-086722 A | 5/2012 |
| KR | 10-0916459 | 9/2009 |
| KR | 10-2013-0136779 | 12/2013 |
| KR | 10-2014-0079155 A | 6/2014 |

* cited by examiner

*Primary Examiner* — Dirk Wright
(74) *Attorney, Agent, or Firm* — Mintz Levin Cohn Ferris Glovsky and Popeo, P.C.; Peter F. Corless

(57) ABSTRACT

An engine clutch transfer torque determining apparatus of a vehicle includes: a power source including an engine and a driving motor; an engine clutch that is located between the engine and the driving motor to selectively connect the engine to the driving motor; and a vehicle controller that controls release or engagement of the engine clutch to implement a driving mode, wherein the vehicle controller releases a clutch hydraulic pressure in the engine clutch when a running state of the vehicle satisfies a transfer torque determining advancing condition, controls a speed of the motor and a speed of the engine while maintaining a speed difference between the motor and the engine in a predetermined relative speed range, and determines a transfer torque of the engine clutch based on a clutch hydraulic pressure and a clutch input torque when the engine clutch slips.

16 Claims, 4 Drawing Sheets

APPARATUS AND METHOD FOR DETERMINING ENGINE CLUTCH TRANSFER TORQUE OF ENVIRONMENTALLY-FRIENDLY VEHICLE

CROSS-REFERENCE TO RELATED APPLICATION

This application claims priority to and the benefit of Korean Patent Application No. 10-2014-0095818 filed in the Korean Intellectual Property Office on Jul. 28, 2014, the entire contents of which are incorporated herein by reference.

BACKGROUND (a) Technical Field

The present disclosure relates to an engine clutch transfer torque determining apparatus of a vehicle. More particularly, the present disclosure relates to an apparatus and method for determining an engine clutch transfer torque of a vehicle, such as an environmentally-friendly vehicle, that can determine a transfer torque of an engine clutch while running.

(b) Description of the Related Art

Nowadays, environmental pollution of the earth is a serious problem, and thus, use of nonpolluting energy is important. Particularly, vehicle exhaust gas is one of the major causes of air pollution.

In order to solve the problem of exhaust gas and to reduce fuel consumption, environmentally-friendly vehicle, such as a hybrid vehicle and an electric vehicle, have been developed. Many environmentally-friendly vehicles use a power generation device that is formed with an engine and a motor, and is driven by using power that is developed by a combustion action of the engine and power that is generated by a rotation of a motor using electrical energy that is stored in a battery.

In environmentally-friendly vehicles, a transmission of a Transmission Mounted Electric Device method (TMED) that connects a driving motor and a transmission is generally performed. In order to transfer power of the engine to a driving shaft, an engine clutch is mounted between the engine and the driving motor.

The environmentally-friendly vehicle also provides an Electric Vehicle (EV) mode that provides running of the vehicle with a torque of only a driving motor and a Hybrid Electric Vehicle (HEV) mode that provides running of the vehicle with the sum of an engine torque and a driving motor torque according to whether coupling of the engine clutch occurs. When the running of the environmentally-friendly vehicle is converted from the EV mode to the HEV mode, an engine speed and a motor speed are synchronized, in a power delivery process between the engine and the driving motor, by coupling the engine clutch and thus preventing a torque from being changed.

However, in an example case in which a battery maintains a low charge state, a temperature of the battery and the motor exceeds a predetermined reference temperature condition, and/or a road has a steeply slanted surface, the environmentally-friendly vehicle should be run by slip-controlling the engine clutch. In such a running condition, in order to slip-control the engine clutch, very accurate pressure control is required.

To this point, a transfer torque of the engine clutch is a torque that is transferred when a friction surface of both ends of the engine clutch physically contact one another, and may be basically predicted through an effective pressure and a friction coefficient. However, in a conventional method of determining a transfer torque, because a transfer torque can be determined only in P gear and N gear, the transfer torque cannot be determined while running the vehicle. Thus, there is not enough opportunity for determining the transfer torque, and accuracy of an engine clutch transfer torque may be deteriorated.

The above information disclosed in this Background section is only for enhancement of understanding of the background of the disclosure, and therefore it may contain information that does not form the related art that is already known in this country to a person of ordinary skill in the art.

SUMMARY

The present disclosure has been made in an effort to provide an apparatus and method for advantageously determining an engine clutch transfer torque of an environmentally-friendly vehicle while the vehicle is running. The present disclosure further provides an apparatus and method for advantageously determining an engine clutch transfer torque of an environmentally-friendly vehicle by monitoring a relationship between a clutch hydraulic pressure and a clutch input torque for a time period from a time at which slip occurs in an engine clutch to a time immediately before the slip releases.

Embodiments of the present disclosure provide an engine clutch transfer torque determining apparatus of a vehicle, including: a power source including an engine and a driving motor; an engine clutch that is disposed between the engine and the driving motor to selectively connect the engine to the driving motor; and a vehicle controller that controls release or engagement of the engine clutch to implement a driving mode, wherein the vehicle controller: i) releases a clutch hydraulic pressure in the engine clutch when a running state of the vehicle satisfies a transfer torque determining advancing condition, ii) controls a speed of the motor and a speed of the engine while maintaining a speed difference between the motor and the engine in a predetermined relative speed range, and iii) determines a transfer torque of the engine clutch based on a clutch hydraulic pressure and a clutch input torque when the engine clutch slips.

The vehicle controller may slowly release the clutch hydraulic pressure in the engine clutch of a lockup state, and monitor the clutch hydraulic pressure and the clutch input torque for a time period from a time at which slip of the engine clutch occurs to a time at which a predetermined slip RPM occurs, in order to determine the transfer torque of the engine clutch.

The vehicle controller may detect an engine torque and a transfer torque, before determining the transfer torque of the engine clutch, and detect the clutch input torque and a clutch transfer torque when the engine clutch slips. The vehicle controller may calculate a correction factor by using at least one of the detected engine torque, the detected transfer torque, the detected clutch input torque, and the detected clutch transfer torque, and determines the transfer torque of the engine clutch using the correction factor.

The vehicle controller may control the speed of the engine to maintain delta RPM, which is a speed difference between the motor and the engine, and control the speed of the motor to maintain an output speed of a transmission.

The transfer torque determining advancing condition may be a condition relating to at least one of a segment in which a running load is constant, a segment in which a temperature of an Automatic Transmission Fluid (ATF) is within a reference temperature range, and a segment in which a State Of Charge (SOC) is within a reference SOC range.

Embodiments of the present disclosure further provide a method of determining an engine clutch transfer torque of a vehicle, including: determining whether a running state of the vehicle satisfies a transfer torque determining advancing condition; releasing a clutch hydraulic pressure in an engine clutch when the running state satisfies the transfer torque determining advancing condition; maintaining a speed difference between a speed of a motor and a speed of an engine at a substantially constant RPM, the motor and the engine being connected to both ends of the engine clutch; controlling the speed of the motor and the speed of the engine; and monitoring a clutch hydraulic pressure and a clutch input torque and determining a transfer torque of the engine clutch, when the engine clutch slips.

The releasing of the clutch hydraulic pressure may include releasing the clutch hydraulic pressure in the engine clutch based on a lockup threshold value or less than the lockup threshold value.

The monitoring of the clutch hydraulic pressure and the clutch input torque may include monitoring the clutch hydraulic pressure and the clutch input torque for a time period from a time at which the engine clutch slips to a time at which a predetermined slip RPM occurs, in order to determine the transfer torque of the engine clutch.

The controlling of the speed of the motor and the speed of the engine may include: controlling a speed of the engine to maintain a delta RPM, which is a speed difference between the motor and the engine; and controlling a speed of the motor to maintain an output speed of a transmission.

The method may further include detecting the engine torque and the transfer torque before determining the transfer torque of the engine clutch.

The determining of a transfer torque of the engine clutch may include: detecting a clutch input torque and a clutch transfer torque when the engine clutch slips; and calculating a correction factor by using at least one of the detected engine torque, the detected transfer torque, the detected clutch input torque, and the detected clutch transfer torque.

The determining of the transfer torque of the engine clutch may include: calculating a first torque deviation by comparing the detected engine torque and the detected clutch input torque; calculating a second torque deviation by comparing the detected transfer torque and the detected clutch transfer torque; calculating a correction factor using the first torque deviation and the second torque deviation; and determining the transfer torque of the engine clutch using the correction factor.

The correction factor may be calculated by Equation 1. Equation 1 may be $F=(A-C)/(B-D)$, where F is the correction factor, A is the detected engine torque, B is the detected transfer torque, C is the detected clutch input torque, and D is the detected clutch transfer torque.

According to embodiments of the present disclosure, because a transfer torque of an engine clutch can be determined while a vehicle runs, a learning frequency of the transfer torque of the engine clutch can be improved. Further, because a transfer torque can be determined using a relationship between a clutch hydraulic pressure and a clutch input torque for a time period from a time at which slip occurs in the engine clutch to a time immediately before slip releases, accuracy of the transfer torque can be improved and drivability can be improved. Various additional effects of embodiments of the present disclosure are described within the detailed description below.

DETAILED DESCRIPTION OF THE EMBODIMENTS

Figure 1:
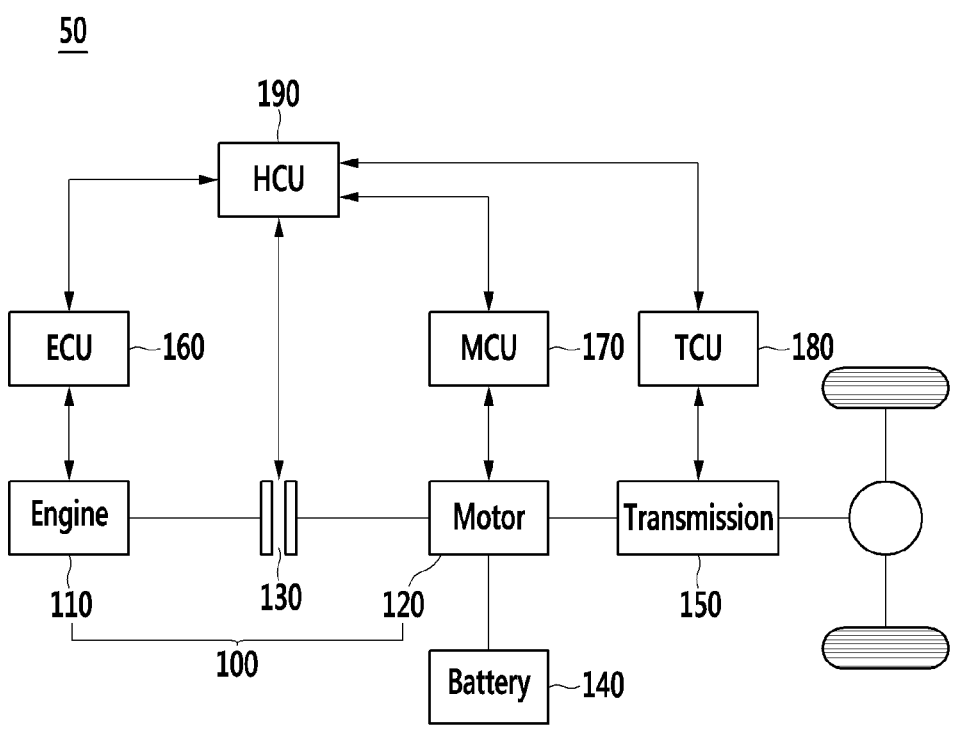
FIG. 1 is a diagram illustrating an engine clutch transfer torque determining apparatus of a vehicle according to embodiments of the present disclosure.

Hereinafter, an operation principle of an apparatus and method for determining an engine clutch transfer torque of an environmentally-friendly vehicle according to embodiments of the present disclosure will be described in detail with reference to the accompanying drawings. However, the attached drawings and a detailed description to be given later relate to embodiments for effectively describing a characteristic of the present disclosure. Therefore, the present disclosure is not limited to only the following drawings and description.

Further, detailed descriptions of well-known functions and structures incorporated herein may be omitted to avoid obscuring the subject matter of the present disclosure. The terms used herein are defined according to the functions of the present disclosure, and may vary depending on a user's or an operator's intension and usage. Therefore, the terms used herein should be understood based on the descriptions made herein. Further, in order to effectively describe technical characteristics of the present disclosure, the following embodiments may appropriately change, integrate, or separate terms to be clearly understood by a person of ordinary skill in the art, and the present disclosure is not limited thereto.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles (e.g., environmentally-friendly vehicles), hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below. Moreover, it is understood that the below methods may be executed by an engine clutch transfer torque determining apparatus comprising the controller, whereby the apparatus is known in the art to be suitable for determining a transfer torque of an engine clutch while the vehicle is running.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings.

FIG. 1 is a diagram illustrating an engine clutch transfer torque determining apparatus of an environmentally-friendly vehicle according to embodiments of the present disclosure.

Referring to FIG. 1, an engine clutch transfer torque determining apparatus (hereinafter referred to as a 'transfer torque determining apparatus') 50 of an environmentally-friendly vehicle includes a power source 100, an engine clutch 130, a battery 140, a transmission 150, an Engine Control Unit (ECU) 160, a Motor Control Unit (MCU) 170, a Transmission Control Unit (TCU) 180, and a Hybrid Control Unit (HCU) 190.

In order to drive an environmentally-friendly vehicle, the power source 100 includes an engine 110 and a motor 120.

An output of the engine 110 is controlled by the control of the ECU 160, and driving thereof is controlled to an optimal driving point according to the control of the ECU 160.

The motor 120 is operated by a three-phase AC voltage that is applied in the MCU 170 to generate a torque. The motor 120 is operated as a generator upon coast down running or regenerative braking to supply a voltage to the battery 140.

The engine clutch 130 is disposed between the engine 110 and the motor 120, and is operated according to the control of the HCU 190 to switch power delivery between the engine 110 and the motor 120. That is, the engine clutch 130 connects or intercepts power between the engine 110 and the motor 120 according to switching of an EV mode and an HEV mode.

The battery 140 is formed with a plurality of unit cells, and a high voltage for providing a driving voltage to the motor 120 is stored in the battery 140. The battery 140 supplies a driving voltage to the motor 120 in an EV mode or an HEV mode, and is charged with a voltage that is generated in the motor 120 upon regenerative braking.

When a commercial power source is plug-in connected, the battery 140 may be charged by a voltage and a current that are supplied through a charge device.

The transmission 150 adjusts a shift ratio according to the control of the HCU 190, distributes an output torque that is added and applied through the engine clutch 130 according to a driving mode with a shift ratio, and transfers the output torque to the driving wheel, thereby enabling the vehicle to run.

The transmission 150 may be an automatic transmission or a continuously variable transmission.

The ECU 160 is connected to the HCU 190 through a network, and by interlocking with the HCU 190, the ECU 160 controls general operations of the engine 110 according to an operation state of the engine 110 such as a request torque signal of a driver, a coolant temperature, and an engine torque. The ECU 160 provides an operation state of the engine 110 to the HCU 190.

The MCU 170 controls driving and torque of the motor 120 according to the control of the HCU 190, and stores electricity that is generated in the motor 120 in the battery 140 upon regenerative braking.

The TCU 180 controls a shift ratio according to each output torque of the ECU 160 and the MCU 170 and determines a regenerative braking amount, i.e., controls general operations the transmission 150. The TCU 180 provides an operation state of the transmission 150 to the HCU 190.

The HCU 190 is a superordinate controller that sets a hybrid running mode and that controls general operations of the environmentally-friendly vehicle. The HCU 190 integrally controls subordinate controllers that are connected through a Controller Area Network (CAN) communication network, collects and analyzes information of each subordinate controller, and executes cooperation control to control output torques of the engine 110 and the motor 120.

The HCU 190 receives information from subordinate controllers and determines whether a running state of the environmentally-friendly vehicle satisfies a transfer torque determining advancing condition. If a running state of the environmentally-friendly vehicle satisfies a transfer torque determining advancing condition, the HCU 190 slowly releases a clutch hydraulic pressure in the engine clutch 130 of a lockup state and monitors a speed of the engine 110 and the motor 120 that are located at respective ends of the engine clutch 130.

When slip occurs in the engine clutch 130, the HCU 190 monitors a clutch hydraulic pressure of the engine clutch 130 and a clutch input torque of the engine clutch 130, and determines a transfer torque of the engine clutch 130 for a time period from a moment at which slip occurs to a predetermined slip Revolutions Per Minute (RPM). In this case, the predetermined slip RPM is a preset value and may be an RPM between an RPM of a moment at which slip occurs in the engine clutch 130 and an RPM of a time point immediately before slip releases. The clutch input torque is a torque that is input to the engine clutch 130 and may be a torque occurring in the engine 110.

A method of determining a transfer torque of the engine clutch 130 in the HCU 190 in this way will be described in detail with reference to FIGS. 2 and 3.

In a vehicle according to embodiments of the present disclosure including the function, a common operation is executed equally or similarly to that in a conventional vehicle, and therefore a detailed description thereof will be omitted.

Figure 2:
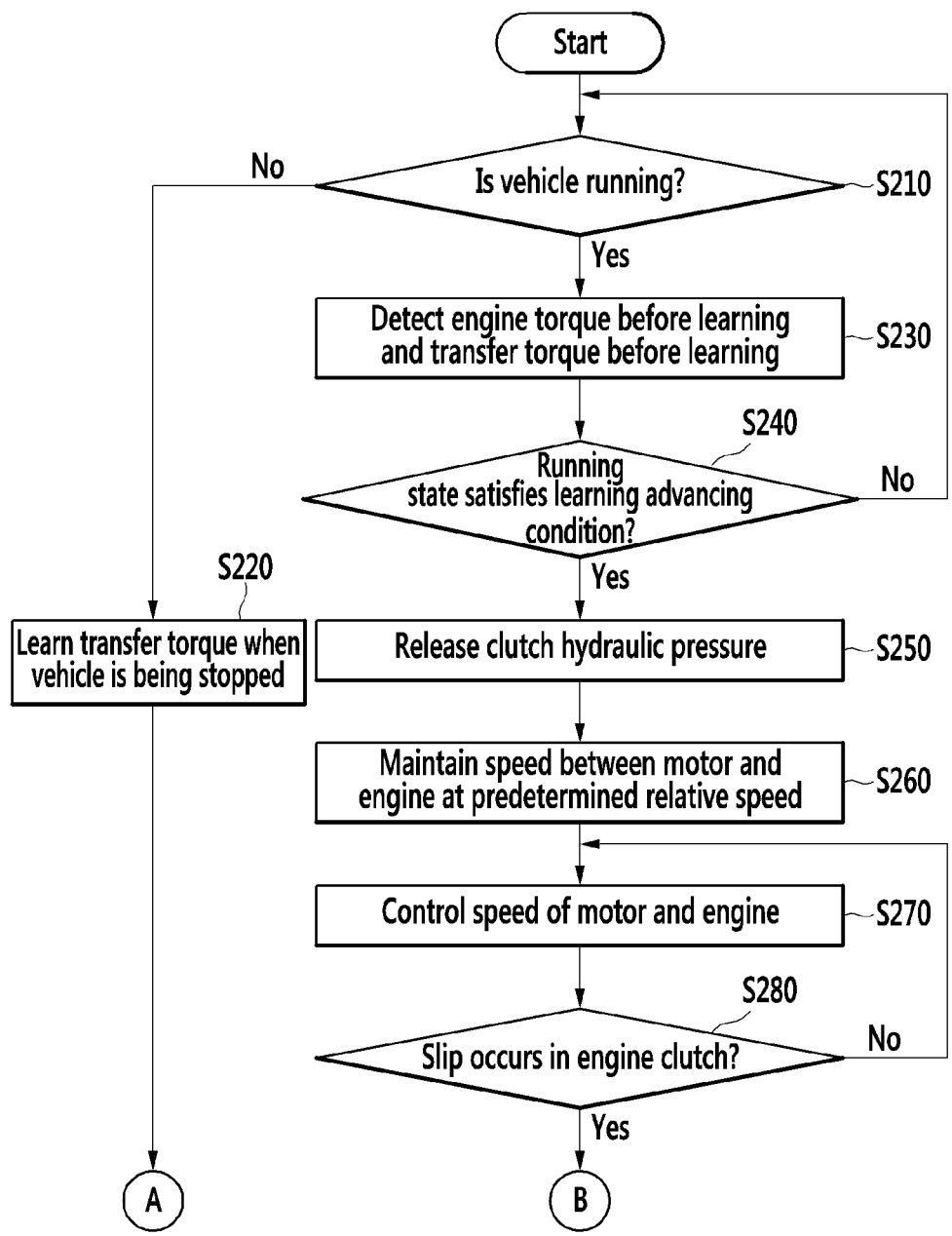
FIGS. 2 and 3 are flowcharts illustrating a method of determining an engine clutch transfer torque in a vehicle according to embodiments of the present disclosure.
Figure 3:
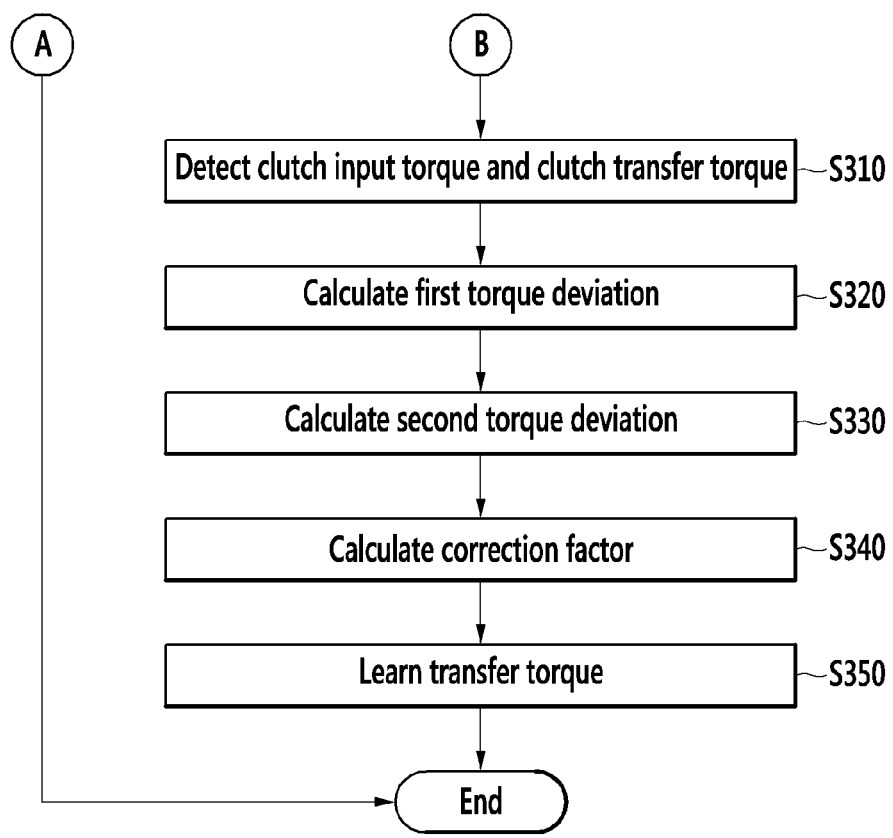

FIGS. 2 and 3 are flowcharts illustrating a method of determining an engine clutch transfer torque in an environmentally-friendly vehicle according to embodiments of the present disclosure. Controllers of the transfer torque determining apparatus 50 according to embodiments of the present disclosure that is described with reference to FIG. 1 may be integrated or subdivided, and constituent elements that perform the above-described function regardless of a corresponding name may be constituent elements of the transfer torque determining apparatus 50 according to embodiments of the present disclosure. Hereinafter, when describing a method of determining a transfer torque of the engine clutch 130 according to embodiments of the present disclosure, in each step, the transfer torque determining apparatus 50 instead of a corresponding controller will be described as a subject.

Referring to FIGS. 2 and 3, the transfer torque determining apparatus 50 determines whether the environmentally-friendly vehicle is running (S210).

When the environmentally-friendly vehicle is being stopped, the transfer torque determining apparatus 50 may determine a transfer torque of the engine clutch 130 (S220), as disclosed in Korean Patent Laid-Open Publication No. 10-2013-0136779. That is, when the transmission 150 is coupled to "P gear" or "N gear", the transfer torque determining apparatus 50 couples the engine clutch 130 with a control pressure exceeding a kiss point in a state that maintains a predetermined relative speed between the engine 110 and the motor 120 of a no load state.

The transfer torque determining apparatus 50 measures a transfer torque of the engine clutch 130 that is transferred to the motor 120, compares a difference between the transfer torque and a basic model value, and determines a transfer torque of the engine clutch 130. The transfer torque determining apparatus 50 determines a transfer torque of the engine clutch 130 to complete determining of the transfer torque.

Figure 4:
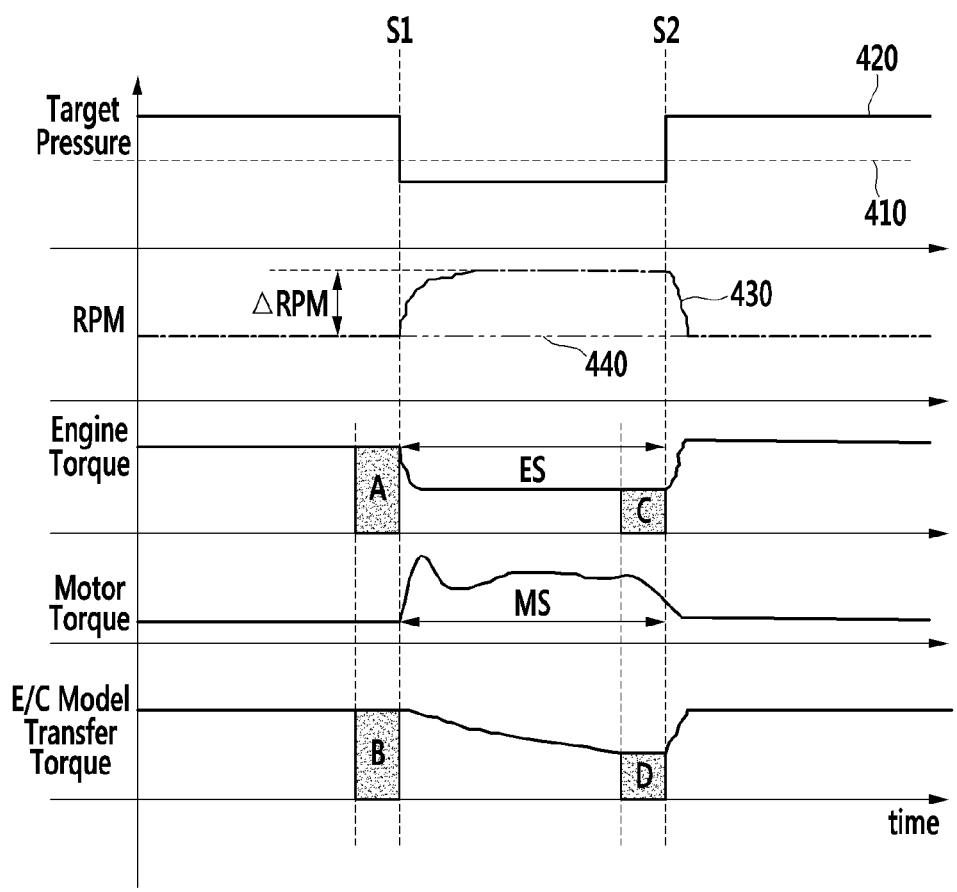
FIG. 4 is a diagram illustrating an engine clutch transfer torque determining concept in a vehicle according to embodiments of the present disclosure.

When the environmentally-friendly vehicle is running, before determining a transfer torque, the transfer torque determining apparatus 50 detects an engine torque before determining and a transfer torque before determining (S230). That is, as shown in FIG. 4, before slip occurs in the engine clutch 130, the transfer torque determining apparatus 50 may detect an engine torque A before determining and a transfer torque B before determining.

The transfer torque determining apparatus 50 determines whether a running state satisfies a determining advancing condition (S240). In order words, the transfer torque determining apparatus 50 determines whether a running state satisfies a condition of at least one of a segment in which a running load is constant, a segment in which a temperature of an Automatic Transmission Fluid (ATF) is within a reference temperature, and a segment in which a State Of Charge (SOC) is within a reference SOC. In this case, a segment in which a running load is constant may be a segment in which the vehicle runs at a constant speed with cruise control.

If a running state satisfies a determining advancing condition, the transfer torque determining apparatus 50 releases a clutch hydraulic pressure in the engine clutch 130 (S250). That is, the transfer torque determining apparatus 50 may release a clutch hydraulic pressure 420 to a lockup threshold value 410 or less in the engine clutch 130, as shown in FIG. 4. Here, the lockup threshold value may represent an amount of clutch hydraulic pressure for lockup of the engine clutch 130.

The transfer torque determining apparatus 50 maintains a speed between the motor 120 and the engine 110 at a predetermined relative speed (S260). That is, as shown in FIG. 4, in order to determine a transfer torque of the engine clutch 130, the transfer torque determining apparatus 50 controls engine RPM 430 and motor RPM 440 to maintain delta RPM of a predetermined level between the motor 120 and the engine 110.

The transfer torque determining apparatus 50 controls a speed of the motor 120 and the engine 110 (S270). Specifically, when the engine RPM 430 and the motor RPM 440 arrive at delta RPM of a predetermined level, the transfer torque determining apparatus 50 controls (ES) a speed of the engine 110 to maintain the delta RPM, as shown in FIG. 4. In order to maintain an output speed of the transmission 150, the transfer torque determining apparatus 50 controls (MS) a speed of the motor 120, as shown in FIG. 4.

The transfer torque determining apparatus 50 determines whether slip occurs in the engine clutch 130 (S280).

If slip does not occur in the engine clutch 130, the process returns to step S270 and the transfer torque determining apparatus 50 controls a speed of the motor 120 and the engine 110 until slip occurs in the engine clutch 130.

When the engine clutch 130 slips, the transfer torque determining apparatus 50 detects a clutch input torque and a clutch transfer torque (S310). That is, the transfer torque determining apparatus 50 may detect a clutch input torque C and a clutch transfer torque D that are input to the engine clutch 130 for a time period from a moment S1 at which the engine clutch 130 slips to a predetermined slip RPM S2, as shown in FIG. 4.

The transfer torque determining apparatus 50 calculates a first torque deviation using an engine torque before determining and a clutch input torque (S320). That is, as shown in FIG. 4, by comparing the engine torque A before determining and the clutch input torque C, the transfer torque determining apparatus 50 may calculate a first torque deviation.

The transfer torque determining apparatus 50 calculates a second torque deviation using a transfer torque before determining and a clutch transfer torque (S330). That is, as shown in FIG. 4, by comparing a transfer torque before determining and a clutch transfer torque, the transfer torque determining apparatus 50 may calculate a second torque deviation.

The transfer torque determining apparatus 50 calculates a correction factor using the first torque deviation and the second torque deviation (S340).

That is, the transfer torque determining apparatus 50 may calculate a correction factor using Equation 1.

$$F = (A-C)/(B-D) \quad \text{[Equation 1]}$$

Herein, F is a correction factor, A is an engine torque before determining, B is a transfer torque before determining, C is a clutch input torque, and D is a clutch transfer torque.

The transfer torque determining apparatus 50 determines a transfer torque of the engine clutch 130 using the correction factor (S350).

Thereafter, when a transfer torque of the engine clutch 130 completes determining, by increasing a clutch hydraulic pressure, the transfer torque determining apparatus 50 may release slip of the engine clutch 130.

Therefore, because the engine clutch transfer torque determining apparatus 50 of an environmentally-friendly vehicle according to the present disclosure can determine a transfer torque of the engine clutch 130 even when the environmentally-friendly vehicle is running, the engine clutch transfer torque determining apparatus 50 can improve a determining frequency of the transfer torque of the engine clutch 130.

DESCRIPTION OF SYMBOLS

100: power source
110: engine
120: motor
130: engine clutch
140: battery
150: transmission
160: ECU
170: MCU
180: TCU
190: HCU While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. An engine clutch transfer torque determining apparatus of a vehicle, the engine clutch transfer torque determining apparatus comprising:
    a power source including an engine and a driving motor;
    an engine clutch that is disposed between the engine and the driving motor to selectively connect the engine to the driving motor; and
    a vehicle controller that controls release or engagement of the engine clutch to implement a driving mode,
    wherein the vehicle controller: i) releases a clutch hydraulic pressure in the engine clutch when a running state of the vehicle satisfies a transfer torque determining advancing condition, ii) controls a speed of the motor and a speed of the engine while maintaining a speed difference between the motor and the engine in a predetermined relative speed range, and iii) determines a transfer torque of the engine clutch based on a clutch hydraulic pressure and a clutch input torque when the engine clutch slips.

2. The engine clutch transfer torque determining apparatus of claim 1, wherein the vehicle controller slowly releases the clutch hydraulic pressure in the engine clutch of a lockup state, and monitors the clutch hydraulic pressure and the clutch input torque for a time period from a time at which slip of the engine clutch occurs to a time at which a predetermined slip RPM occurs, in order to determine the transfer torque of the engine clutch.

3. The engine clutch transfer torque determining apparatus of claim 1, wherein the vehicle controller detects an engine torque and a transfer torque before determining the transfer torque of the engine clutch, and detects the clutch input torque and a clutch transfer torque when the engine clutch slips.

4. The engine clutch transfer torque determining apparatus of claim 3, wherein the vehicle controller calculates a correction factor by using at least one of the detected engine torque, the detected transfer torque, the detected clutch input torque, and the detected clutch transfer torque, and determines the transfer torque of the engine clutch using the correction factor.

5. The engine clutch transfer torque determining apparatus of claim 1, wherein the vehicle controller controls the speed of the engine to maintain delta RPM, which is a speed difference between the motor and the engine, and controls the speed of the motor to maintain an output speed of a transmission.

6. The engine clutch transfer torque determining apparatus of claim 1, wherein the transfer torque determining advancing condition is a condition relating to at least one of a segment in which a running load is constant, a segment in which a temperature of an Automatic Transmission Fluid (ATF) is within a reference temperature range, and a segment in which a State Of Charge (SOC) is within a reference SOC range.

7. A method of determining an engine clutch transfer torque of a vehicle, the method comprising:
    determining whether a running state of the vehicle satisfies a transfer torque determining advancing condition;
    releasing a clutch hydraulic pressure in an engine clutch when the running state satisfies the transfer torque determining advancing condition;
    maintaining a speed difference between a speed of a motor and a speed of an engine at a substantially constant RPM, the motor and the engine being connected to both ends of the engine clutch;
    controlling the speed of the motor and the speed of the engine; and
    monitoring a clutch hydraulic pressure and a clutch input torque and determining a transfer torque of the engine clutch, when the engine clutch slips.

8. The method of claim 7, wherein the releasing of the clutch hydraulic pressure comprises releasing the clutch hydraulic pressure in the engine clutch based on a lockup threshold value or less than the lockup threshold value.

9. The method of claim 7, wherein the monitoring of the clutch hydraulic pressure and the clutch input torque comprises monitoring the clutch hydraulic pressure and the clutch input torque for a time period from a time at which the engine clutch slips to a time at which a predetermined slip RPM occurs, in order to determine the transfer torque of the engine clutch.

10. The method of claim 7, wherein the controlling of the speed of the motor and the speed of the engine comprises:
    controlling a speed of the engine to maintain a delta RPM, which is a speed difference between the motor and the engine; and
    controlling a speed of the motor to maintain an output speed of a transmission.

11. The method of claim 7, further comprising detecting the engine torque and the transfer torque before determining the transfer torque of the engine clutch.

12. The method of claim 11, wherein the determining of the transfer torque of the engine clutch comprises:
    detecting, a clutch input torque and a clutch transfer torque when the engine clutch slips; and
    calculating a correction factor by using at least one of the detected engine torque, the detected transfer torque, the detected clutch input torque, and the detected clutch transfer torque.

13. The method of claim 12, wherein the determining of the transfer torque of the engine clutch comprises:
    calculating a first torque deviation by comparing the detected engine torque and the detected clutch input torque;
    calculating a second torque deviation by comparing the detected transfer torque and the detected clutch transfer torque;
    calculating a correction factor using the first torque deviation and the second torque deviation; and
    determining the transfer torque of the engine clutch using the correction factor.

14. The method of claim 13, wherein the correction factor is calculated by the following Equation:

$$F=(A-C)/(B-D),$$

where F is the correction factor, A is the detected engine torque, B is the detected transfer torque, C is the detected clutch input torque, and D is the detected clutch transfer torque.

15. The method of claim 7, wherein the transfer torque determining advancing condition is a condition relating to at least one of a segment in which a running load is constant while the vehicle is running, a segment in which a temperature of an Automatic Transmission Fluid (ATF) is within a reference temperature range, and a segment in which a State Of Charge (SOC) is within a reference SOC range.

16. A non-transitory computer readable medium containing program instructions executed by a processor or controller, the computer readable medium comprising:
    program instructions that determine whether a running state of the vehicle satisfies a transfer torque determining advancing condition;

program instructions that release a clutch hydraulic pressure in an engine clutch when the running state satisfies the transfer torque determining advancing condition;

program instructions that maintain a speed difference between a speed of a motor and a speed of an engine at a substantially constant RPM, the motor and the engine being connected to both ends of the engine clutch;

program instructions that control the speed of the motor and the speed of the engine; and program instructions that monitor a clutch hydraulic pressure and a clutch input torque and determining a transfer torque of the engine clutch, when the engine clutch slips.

* * * * *